Nov. 16, 1965  S. DI RENZO  3,217,959
SOLDERING APPARATUS
Filed April 17, 1963  2 Sheets-Sheet 1
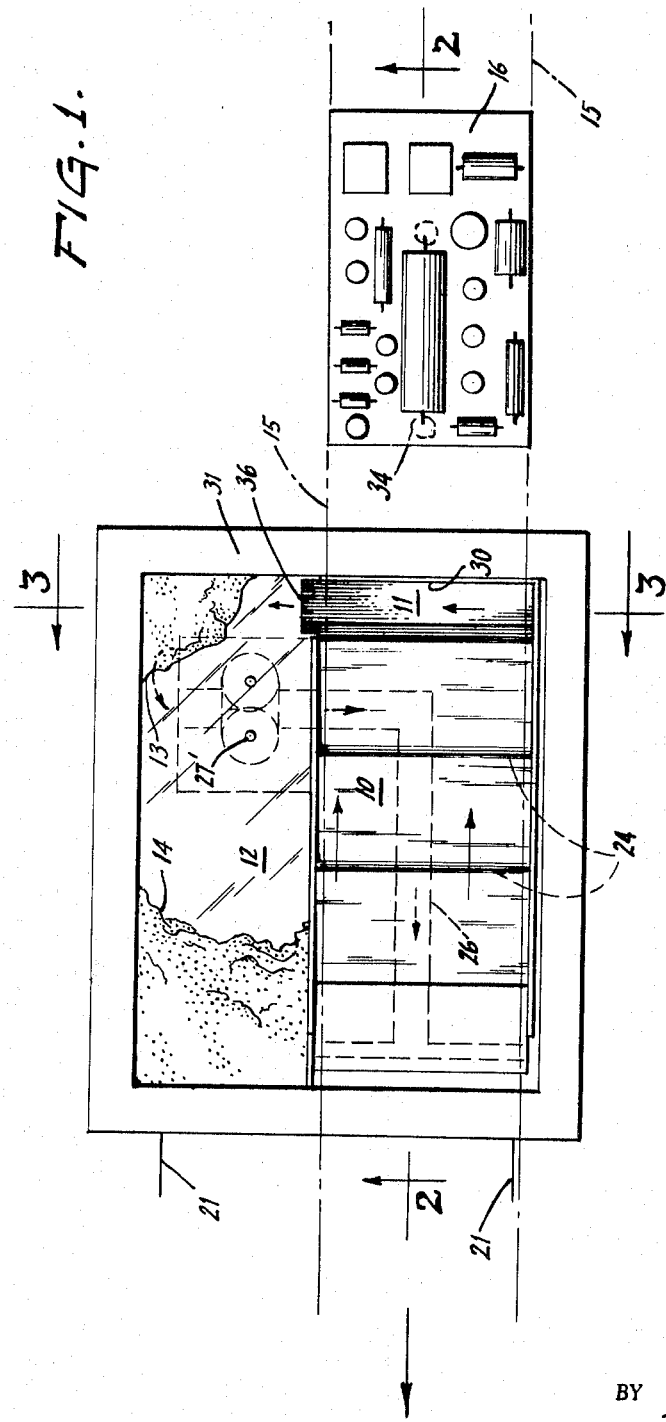
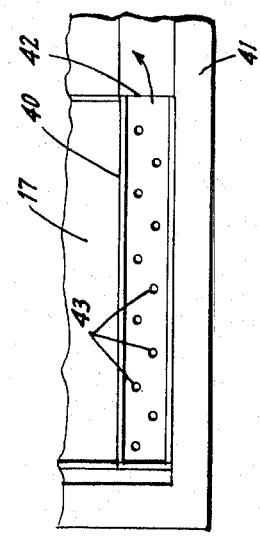
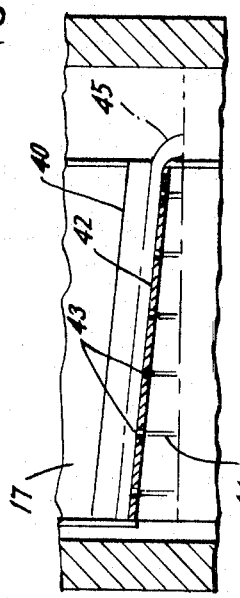
INVENTOR.
SIMON DI RENZO
BY
ATTORNEY

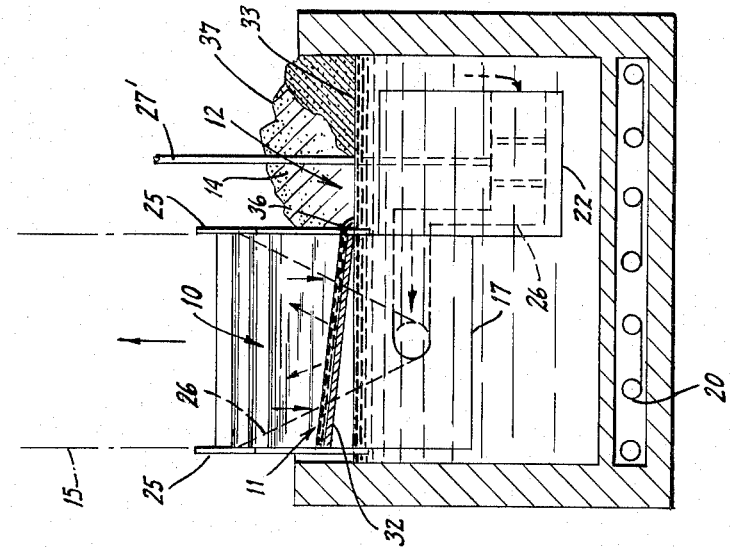
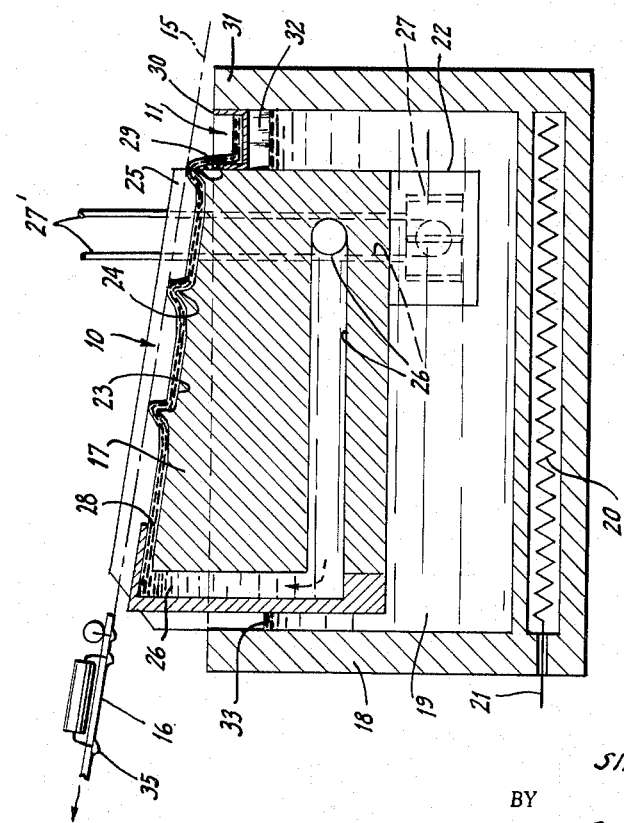

United States Patent Office 3,217,959
Patented Nov. 16, 1965

3,217,959
SOLDERING APPARATUS
Simon Di Renzo, Philadelphia, Pa., assignor to Philco Corporation, Philadelphia, Pa., a corporation of Delaware
Filed Apr. 17, 1963, Ser. No. 273,614
2 Claims. (Cl. 228—37)

This invention relates to the art of soldering. While being of broader utility it will be described as applied to a machine of the "ripple soldering" type employed in the fabrication of "printed circuit" panels.

Difficulties were heretofore encountered with such machines, due to the formation and building up of a floating mixture of metal oxides, flux and the like. The floating material, called dross, tended to accumulate in front of the soldering area, where it interfered with the process to be performed. It was necessary at frequent intervals to remove the accumulated dross, and such removal again interfered with the productive work of the machine.

I have found that operations of the indicated type can be improved by the use of a restricted, advantageously sloping solder passage, leading from the foot of an open soldering area to the top of a deep, stagnant solder pool. Desirably the passage or channel is coextensive with the region where the circuit panels or other devices are received for soldering. Solder from a ripple soldering area can cascade over the side wall of the channel, and this solder can then flow along the sloping channel as a gravitational stream, at a predetermined and appreciable speed, so that dross cannot accumulate in the panel-receiving region of the machine. Desirably the new duct is a straight channel, oriented in a direction transverse to the ripple-soldering liquid current. This invention, accordingly provides a machine characterized by such a channel, and a method of operation comprising such cascading and gravitational solder flows and control of dross accumulation.

The new arrangement will be understood without difficulty from the following complete description of a preferred embodiment, wherein reference will be had to the drawing appended hereto. In FIGURE 1 I have shown a plan view of the preferred embodiment. FIGURES 2 and 3 are sections taken respectively along lines 2—2 and 3—3 in FIGURE 1. FIGURE 4 is a sectional view of a detail slightly modified from FIGURE 3. FIGURE 5 is a plan view of such modified detail. A continuous succession of circuit panels received and treated for soldering is represented by the showing of one panel (at right) in FIGURE 1 and another panel (at left) in FIGURE 2. The solder is shown in FIGURES 1 to 3, while being indicated schematically in FIGURE 4 and being omitted in FIGURE 5.

Referring initially to the plan view of FIGURE 1, the new system as shown comprises three distinct regions: a ripple-soldering area 10; the new transverse front passage 11; and an open solder pool 12 for accumulation and removal of dross. Solder is circulated and recirculated in the direction 10–11–12. The three regions, including particularly the new passage 11, are so arranged that dross 13, 14 accumulates only on the surface of solder pool 12.

By virtue of this new arrangement it becomes possible to utilize a path 15 for devices to be soldered, for instance wiring panels 16, which path is permanently kept undisturbed by dross. The path is shown herein as a slightly inclined, planar area, spaced from quiescent solder pool 12. In the region of the soldering machine this path extends only (1) across the relatively narrow passage or channel 11 and then (2) over the soldering area 10. The latter area is as wide as channel 11 is long, while the length of area 10, along path 15, is sufficient to provide for one, two or more solder ripples; three are shown.

As more particularly shown in FIGURE 2, path 15 and soldering area 10 have a slight gradient, rising from the new lateral solder passage 11. Soldering area 10 can be provided for instance by the sloping top of a conventional pump and ripple block 17, desirably made for instance of steel and suitably installed, as by superstructure not shown, in a tank 18. In this tank, solder 19 is held in liquid condition by heating means 20, which are shown in form of electrical coils with terminals 21. A pump unit 22—deeply immersed in the liquid solder and preferably forming a portion of block 17—raises liquid solder to the top of the inclined upper portion 10 of block 17. From here a slightly inclined ramp or plane 23, with weirs 24 extending horizontally thereover, extends downwardly so that solder, running down this inclined plane, forms a ripple as it passes over each weir. The ripple plane or ripple area, provided by these arrangements, is bordered by side walls 25 and is so arranged, relative to path 15 of panels 16, that the undersides of these panels only touch the solder ripples, as is known. In order to produce and maintain the rippling solder flow, a passage system 26 is formed in block 17, leading from the intake of a gear pump 27, in pump unit 22, upwardly to a discharge slot 28 at the top of inclined plane 23.

In particular accordance with the invention, as illustrated, the lowermost weir 29 of ripple soldering area 10 discharges into a shallow trough 30, providing the aforementioned transverse flow zone 11. Side walls of this trough can for instance be secured to block 17, or tank wall 31, or both, as generally indicated in the drawing.

As further shown in FIGURE 3, bottom 32 of trough 30 is slightly inclined from one end of the trough, near one side of block 17, toward solder pool 12 on the other side. The inclination of tray or bottom 32 can be minute; in comparison with slope actually to be used in most cases, the drawing shows this inclination, as well as that of ripple area 10, with some little exaggeration in the interest of clear and contrasting illustration. The passage for solder, provided by channel 30, is desirably unobstructed, as no further ripples are needed at this stage and as the channel serves only to convey the solder—as rapidly as conveniently possible—from directly below weir 29 to the quiescent solder pool 12.

By means of the new arrangement the following improved *operation* is performed. Solder metal is maintained in molten condition in tank 18, by operation of heater 20, and the liquid level 33 of solder pool 12 is maintained at or directly below the lower end of bottom 32 of inclined channel 30 (FIGURE 3). This lower end is closely below the lowermost weir 29 of ripple area 10 (FIGURE 2), as channel 30 is shallow, slightly inclined, and spaced closely below the weir. The maintenance of the so-defined liquid solder level can be effected for instance by continuously or periodically replacing approximately those amounts of solder which have been removed with the soldered circuit panels.

The gear pump is driven by suitable shafts 27', so that in the upwardly open solder areas 10 and 11, having downward gradients between the high point 28 of the solder pumping system and the general solder level 33, solder is in downward motion. This solder is at least initially free of solder oxides or dross, as it is drawn from the bottom of pool 12 into the intake of gear pump 27 for recirculation to top portion 28 of soldering area 10. By contrast, the solder particles at the top of quiescent pool 12 do not partake of any motion such as this gravitationally induced downward current; they are stagnantly exposed to the atmosphere and are therefore oxidized. The moving solder particles are exposed to air, in open areas 10, 11, for only a very few seconds during each passage, thereby minimizing further oxidation of the running solder.

As a result of these conditions the new apparatus presents a unique surface appearance to the observer, which is depicted by FIGURE 1. The solder has characteristic and different appearance in each of two major divisions of the new apparatus. One of these major divisions comprises solder flow area 10, 11. This area gives the impression of being a bright and clear metallic mirror, this mirror being of peculiar shape and surface arrangement as it comprises a sloping plane with ripples permanently positioned therein and with a transverse gradient at the foot of the sloping plane. The other major division, disposed next to these surfaces and contrasting with their mirror-like quality, consists of the stagnant solder pool 12. Initially this pool looks like a heavily tarnished metal block filling the tank and presenting a flat surface of dull texture and iridescent color, this surface being provided by a skin of oxidized solder which is formed at once, at the start of operation.

Continued operation causes this skin or surface material to rise, and irregularity to appear therein. The reason is that a succession of circuit panels 16 is passed over the mirror-bright soldering region 10, along path 15, for instance by conveyor equipment, not shown. Suitable solder contact areas, including for instance metallic strips and beads, are provided on the undersides of the panels, one such area being schematically indicated in FIGURE 1 at 34. These several contact areas, on a circuit panel 16 newly arriving in the machine, come into repeated contacts with solder ripples, at weirs 29 and 24, for the purpose that surrounding and adherent air and vapor be dislodged from the panel surface and that the solder should wet the solid metallic portions of the underside of the panel. The desired solder spots 35 (FIGURE 2) are thus formed with consistency. Also, and importantly for the new arrangement of the tank, it must here be noted that, as a pretreatment for the ripple soldering operation, some suitable flux or oxygen-absorbing material is usually applied to the panel undersides. Particles of this flux are picked up by the solder in the ripple area 10. They contribute heavily to the formation of dross.

The solder, carrying newly collected flux, oxides and impurities, continuously cascades into one side of the new duct 11, at 29. It then streams gravitationally along the inclined bottom 32 of this duct (FIGURE 3), and finally re-enters the general solder pool, at 36, where a second cascade may be formed, this cascade being of minor width. The height of this second cascade depends on the exact location of solder liquid level 33. Desirably this level is kept as close to the lower end of channel 30 as possible.

In stagnant pool 12 the newly collected, relatively light flux materials as well as newly formed oxygen compounds rise to the stagnant surface of the solder, or in other words to the underside of the previously formed iridescent oxide layer. These conditions cause the floating dross in pool 12 to build up and irregularly to rise, as is indicated in FIGURE 3 at 37. The rate of building up and rising can be very rapid when well-fluxed panels are soldered continuously.

Heretofore, building up and rising of dross occurred directly in front of the solder area, where such an accumulation rapidly developed into a major nuisance. Nor was it possible to overcome this nuisance by simply raising the ripple solder area to a higher position above the liquid level in the solder pool, or by lowering that level. The reason was that every inch and in fact, every fractional inch of additional rise of the ripple area adds to the length of the connected solder passages, in block 17, thereby causing significant chilling of the liquid solder and thereby in turn contributing heavily to the heating costs and to the problems of keeping the entire arrangement operable. The new lateral flow system 11 has overcome these problems.

This new system has also made it possible to provide advantageous timing of clean-out operations for the removal of accumulated dross and to perform the entire operation effectively. So long as dross was allowed to accumulate directly in front of the solder area it had to be removed very frequently; otherwise the point was quickly reached where the top of the rising dross scraped the underside of incoming panels. In some such cases, dross particles were upwardly displaced into the ripple flow area, where they deformed the shape of the solder ripples, thereby vitiating the soldering process. In any event it was necessary in the prior operation to interrupt the productive work of the machine each time that dross was to be cleaned out from the front area. Such interruptions are avoided by the new system.

This system also allows accumulation and removal of dross in relatively long cycles, thereby additionally saving operating expense. FIGURE 1 shows an irregular area of pool 12, near the middle thereof, as having been cleared by scooping out dross. It will be understood that a variety of dross removal operations can be performed on the surface of pool 12, either by hand or by any desired mechanized skimming equipment, not shown.

FIGURES 4 and 5 show a slightly modified construction of the lateral flow passage, wherein duct 40, extending along tank wall 41, has a bottom 42 with small apertures 43 therein, thereby providing for branching off of solder portions from lower layers of the stream flowing through the passage. These branched-off solder portions pass through apertures 43 in form of small jets 44, while a terminal cascade 45 is formed by the solder which continues to pass along the passage. This arrangement allows the use of larger quantities of circulating solder, without appreciable building up of solder in the channel or passage. The larger quantities of circulating solder are sometimes needed, for instance when circuit panels are to be soldered which have specially large numbers or areas of solder spots. It will be understood that the rate of circulation of solder, within the machine, can be modified by varying the operating speed of the gear pump and that dfferent type of lateral-flow channels, such as imperforate channel 30 or a channel 40 with one type of bottom perforations, can be installed interchangeably in the solder tank.

While only two embodiments of the invention have been described, the details thereof are not to be construed as limitative of the invention. The invention contemplates such variations and modifications as come within the scope of the appended claims.

I claim:
1. In a ripple soldering machine wherein liquid solder is pumped from a lower storage region of a tank to upper regions of a ripple ramp for downward, rippling passage of the solder over horizontal weirs disposed across said ramp and to a lower horizontal edge portion of said ramp, and wherein fluxed panels and the like move in a path overlying said ramp: the improvement which comprises disposing at least a substantial portion of said lower storage region to one lateral side of said ramp, and providing means for conducting solder, flowing across said lower horizontal edge, in a direction laterally across said path and downwardly away from said ramp toward and into the mentioned storage region, whereby to prevent accumulation of dross in the path of movement of the fluxed panels.

2. In a ripple soldering machine having an inclined ramp with horizontal weirs extending across the top surface thereof and with a lower horizontal edge for downward rippling gravitational passage of solder over said weirs and edge, said machine also having means for moving solder from a lower part thereof to the upper end of said ramp, and means for soldering fluxed components by moving them upwardly along an inclined path passing over said edge and weirs, the improvement which comprises: a tank providing a solder storage region generally underlying said ramp and extending beyond the same in the direction of said passage of solder to provide an end portion of the tank, said tank also extending beyond said ramp transversely of said direction to provide a side portion of the tank; and a trough in said end portion, said trough extending generally along said lower horizontal edge, said trough being located below said edge to receive the solder passing over said edge, and being inclined downwardly to an upper part of said side portion, whereby to circulate used solder along said trough, into said side portion, and away from said edge and end portion.

References Cited by the Examiner

UNITED STATES PATENTS

| | | | |
|---|---|---|---|
| 2,869,497 | 1/1959 | Lehner | 113—126 |
| 3,037,274 | 6/1962 | Hancock | 29—503 |
| 3,009,185 | 6/1962 | Oates | 29—503 |

CHARLES W. LANHAM, *Primary Examiner.*